US006942720B2

(12) United States Patent
Davies et al.

(10) Patent No.: US 6,942,720 B2
(45) Date of Patent: Sep. 13, 2005

(54) APPARATUS AND METHOD FOR TREATING A FLUID

(75) Inventors: Graham Arthur Davies, Nether Alderley (GB); Johannes Lambertus Nooijen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 72 days.

(21) Appl. No.: 10/371,622

(22) Filed: Feb. 21, 2003

(65) Prior Publication Data

US 2003/0172810 A1 Sep. 18, 2003

(30) Foreign Application Priority Data

Feb. 21, 2002  (EP) ............................................ 02251178

(51) Int. Cl.$^7$ ............................................. B01D 19/00
(52) U.S. Cl. ............................. 95/260; 96/206; 96/207; 96/215; 55/463
(58) Field of Search ............................. 95/260; 96/207, 96/215, 206; 55/463; 239/11, 12, 17

(56) References Cited

U.S. PATENT DOCUMENTS

| 1,055,549 A | * | 3/1913 | McIntosh | 96/215 |
| 1,095,463 A | * | 5/1914 | Kieser | 96/169 |
| 1,756,288 A | * | 4/1930 | Gray et al. | 96/168 |
| 4,782,857 A | | 11/1988 | Bieri | 137/561 A |
| 5,606,854 A | * | 3/1997 | Hoffmann | 60/274 |

FOREIGN PATENT DOCUMENTS

| DE | 629 588 | | 5/1936 |
| DE | 629588 | * | 5/1936 |
| EP | 0195464 A1 | | 1/1986 |
| GB | 1119699 | | 7/1968 |
| WO | 01/60478 A1 | | 8/2001 |

OTHER PUBLICATIONS

International Search Report of Jun. 13, 2003.

* cited by examiner

Primary Examiner—Duane Smith
Assistant Examiner—Douglas J. Theisen
(74) Attorney, Agent, or Firm—Charles W. Stewart

(57) ABSTRACT

The invention relates to an apparatus for treating a fluid having at least one treating zone, with a fluid inlet and separation device in it for introducing a separated mixture of liquid and gas into the treating zone. The fluid inlet device has a series of coaxially disposed circumferential vanes, in which each circumferential vane curvedly extends between an intercepting part having a substantially axially directed leading edge and a deflecting part having a substantially radially outwardly extending trailing edge, and wherein the central axis of the inlet device extends parallel or coaxial with an upwardly extending axis of the treating zone. The invention further relates to a fluid inlet device, to a use of the fluid inlet device, and to a method for treating a fluid.

15 Claims, 1 Drawing Sheet

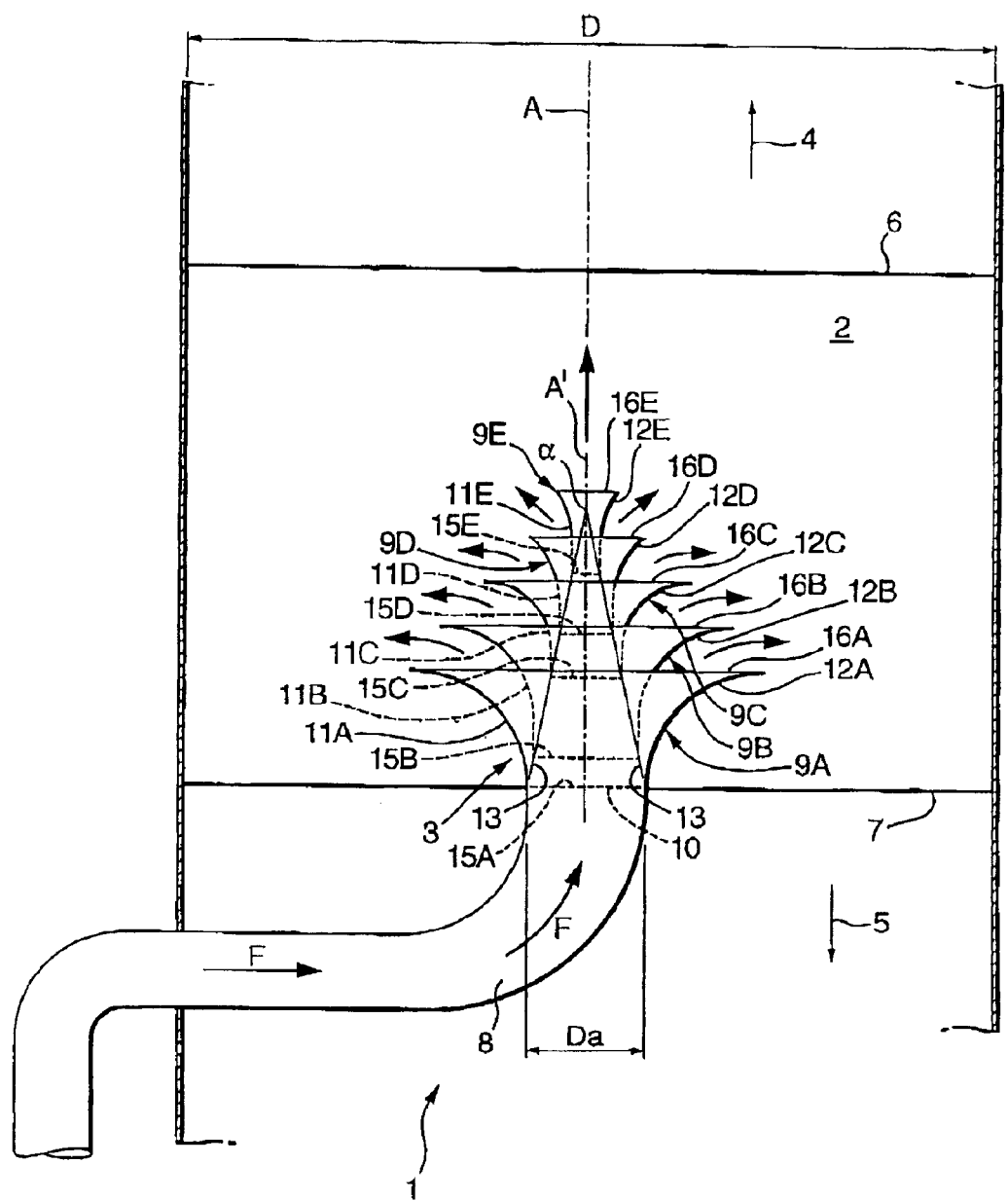
Figure

APPARATUS AND METHOD FOR TREATING A FLUID

FIELD OF THE INVENTION

The present invention relates to an apparatus for treating a fluid, comprising at least one treating zone and a fluid inlet and separation device disposed therein for introducing a mixture of liquid and gas into the treating zone.

BACKGROUND OF THE INVENTION

In the chemical and petrochemical industries it is often the case that mixtures of liquids and vapors have to be introduced into a treating zone, e.g. an inlet treating zone of a vertical column having adjacent treating zones in which gas and liquid are counter currently contacted to exchange heat or matter. An example of such a column is a fractionation column, e.g. a vacuum distillation column and compact gas-liquid separators as described in EP-A-195 464.

In such a column, during normal operation, liquid flows downwards from top to bottom, whereas gas flows upwards from bottom to top. In the distillation process, a fluid comprising a mixture of liquid and gas is inwardly and radially fed into a generally vertically disposed cylindrical distillation column at an inlet zone between the top and the bottom of the column. In installations having a large capacity and throughput, the supply velocity of the mixture is generally very high; these high supply velocities may be disadvantageous to the distribution of the fluid to be treated over the cross-section of the column into which it is fed.

It is in fact desirable, particularly in the distillation process, for the gas phase and the liquid phase to be separated as much as possible immediately after entering the column in the inlet treating zone and for each phase to be separately fed to adjacent treating zones, e.g. by passing through a tray, while being distributed over the column cross section as well as possible.

If no special measures are taken, it will not be possible to effect a proper separation of a gas/liquid mixture fed into the column at a high supply velocity, since the feed will then strike the wall situated opposite the inlet with excessive force, so that the gas subsequently rising up in the column entrains a large portion of the liquid phase. In addition, the liquid which has not been entrained flows for the most part downwards near the column wall opposite to the inlet, thereby causing an uneven distribution of the liquid over the adjacent tray below the inlet. Furthermore, the wall portion of the column opposite the feed may rapidly wear due to the strong impact of the liquid/vapor mixture, so that measures have to be taken to protect or to reinforce the column wall.

To alleviate the above problem, it has been proposed in GB 1 119 699 to provide a fluid inlet device for introducing a mixture of liquid and gas into the column, comprising a box-like arrangement comprising a series of vanes, placed one behind the other along a horizontally disposed central axis extending in radial inward direction of column. In this arrangement, the vanes deflect the mixture sideways relative to the central axis of the inlet device, such that the change in direction of the flow causes a first separation between gas and liquid due to inertia. After insertion into the treating zone, the gas flows upwards in the column, where further contacting with liquid supplied to the top of the column takes place. The separated liquid falls downwards from the vanes onto a gas/liquid contact tray below the inlet device.

Although the known fluid inlet device provides for a great improvement, the fluid inlet device causes a swirling flow of gas in the inlet treating zone. Such a swirling flow decreases the maximum feed rate and increases the height of the column needed to effect full distillation.

It would be advantageous to provide an improved device for treating a fluid having a fluid inlet for introducing a mixture of liquid and gas into the treating zone in which the swirling of the flow in the inlet treating zone is greatly reduced.

SUMMARY OF THE INVENTION

The invention relates to an apparatus for treating a fluid, comprising at least one treating zone having an axis, and a fluid inlet and separation device disposed therein for introducing a separated mixture of liquid and gas into the treating zone, the fluid inlet and separation device comprising a series of coaxially disposed circumferential vanes, wherein each circumferential vane curvedly extends with respect to a central axis of the inlet device between an intercepting part having a substantially axially directed leading edge and a deflecting part having a substantially radially outwardly extending trailing edge, the central axis of the inlet device extending parallel or coaxial with the axis of the treating zone.

BRIEF DESCRIPTION OF THE DRAWING

The FIGURE shows a schematic cross section of a vertically disposed distillation column forming an inlet treating zone. The drawing is only a schematic representation of an exemplary embodiment. In the drawing, identical or corresponding parts are identified with the same reference numerals.

DETAILED DESCRIPTION OF THE INVENTION

In the specification and in the claims, the word "gas" is used to refer to gas and vapor. In the following, the invention will be discussed with reference to a distillation column, however, it should be understood that the invention can be used for any device for treating a fluid, comprising at least one treating zone with a fluid inlet device for introducing a mixture of liquid and gas into the treating zone.

In the fluid inlet device according to the invention, the fluid is intercepted and deflected radially outwardly by the successive vanes such that the gas can be distributed uniformly in an outward direction relative to the central axis into the treating zone, while the liquid particles in the flow strike onto the vane surface due to inertia and centrifugal force and subsequently are discharged from the vane as a more coalesced liquid flow from the circumferential trailing edge of the vane. The alignment of the axes of the fluid inlet device and the treating zone, normally in a vertical direction, allows introduction of the fluid in a way that takes better account of the symmetry of the treating zone.

The stacked circumferential vanes are able to perform a double function of separating the mixture of gas and liquid, and introducing the separated mixture in a generally radial outward direction, thereby reducing swirling flow as observed with the known inlet device. The liquid thus separated from the gas will sink under the influence of gravity after having left the trailing end of the vanes. It will be understood that the separation that takes place in the inlet device does not need to be complete. It is often sufficient to achieve a first separation (pre-separation) in which the bulk of the liquid and gas are separated, but wherein some degree of entrainment of one phase in the other is not critical.

The circumferential vanes are generally open-ended tubulars of a generalized bell-shape, in that they curvedly extend along the central axis of the inlet device between an intercepting part having a substantially axially directed leading edge, and a deflecting part having a substantially radially outwardly extending trailing edge. The horizontal cross-section of the vanes does not need to be circular, and that is why the term generalized bell-shape has been used. Circumferential vanes will in the following also be shortly denoted as vanes. To ensure a uniform distribution of the gas flow, the vanes are preferably symmetrically disposed relative to their central axis, in particular rotationally symmetrically disposed.

By providing the circumferential vanes with a substantially cylindrical intercepting part, the vanes can intercept the flow in a smooth manner. Preferably, the intercepting parts of successive vanes have decreasing diameter. This way, the flow can be divided into concentric layers, each of which is deflected radially outwardly.

Preferably, the intercepting part of a successive vane extends into the previous vane. The vane having the shortest axial distance between its trailing edge and the inlet end of the inlet device is considered as the first vane in the description and in the claims. The second vane is the successive vane with regard to the first vane, and so forth until the last vane which has the largest axial distance between its trailing edge and the inlet end.

In one embodiment, the leading edges of the vanes are spaced along the central axis, preferably at equal distances. This way, the vanes may have the same basic shape. Alternatively, the intercepting parts may each axially extend to a radial inlet plane at the inlet end of the fluid flow device. The radial inlet plane during normal operation is a horizontal plane, transverse with respect to the fluid flow direction at the inlet end. The leading edges of the vanes may converge, away from the inlet end of the fluid inlet device, along a linear cone having a top angle $\alpha$ between 10°–50°, preferably between 20°–40°, in particular between 36° and 37°, the cone extending coaxially with the central axis of the inlet device.

The deflecting parts of successive vanes may be axially spaced, preferably at equal spacings. By providing successive vanes with trailing edges that extend to a decreasing radial diameter, the gas flow can be distributed more evenly along the radius of the treating zone, i.e. over the cross-section of the treating zone.

Experiments have shown that the number of vanes preferably range from 2 to 10, more preferably from 4 to 6, and is in particular 5.

In a preferred embodiment, the inlet device extends coaxially with the central longitudinal axis of a treating zone in a vertically disposed column. The inlet device is disposed between two horizontally extending partitions or trays of the column, defining the treating zone. The lower partition can be the bottom of the column.

Experiments have shown that in such an arrangement, the cross-section of the first, radially outermost vane at its leading edge is suitably less than the cross-section of a circular cylinder having a diameter of about 20% of the diameter of the column, and preferably this cross-section is as small as practically possible.

To further enhance the distribution of the flow, the deflecting parts of at least a number of successive posterior vanes extend towards their trailing edges more axially upwardly than a number of successive anterior vanes, when the mixture of fluid enters the inlet device at its lower end. In particular, the last two or three vanes may extend towards their trailing edges increasingly axially upward. Anterior vanes are vanes having a shorter axial distance of their trailing edges from the inlet end of the inlet device than posterior vanes.

According to the present invention there is further provided a fluid inlet device, in particular for introducing a pre-separated mixture of liquid and gas into the treating zone of an apparatus comprising a series of coaxially disposed circumferential vanes, wherein each circumferential vane curvedly extends with respect to a central axis of the inlet device between an intercepting part having a substantially axially directed leading edge and a deflecting part having a substantially radially outwardly extending trailing edge.

Further, the invention relates to the use of such a fluid inlet device for pre-separating a mixture of liquid and gas and for introducing the pre-separated mixture into a treating zone, in particular into the treating zone of an apparatus according to the invention.

The invention also relates to a method for introducing a mixture of liquid and gas into a vessel, wherein the mixture is introduced into the vessel by dividing an initially substantially cylindrical flow into concentric layers, which layers are deflected radially outwardly. Each layer is introduced at a different axial position. In the method, preferably the more radially inwardly disposed layers are deflected outwardly with a lesser radial component of deflection than the more radially outwardly disposed layers.

The invention will now be described in more detail, with reference to the FIGURE.

The FIGURE shows a section of a distillation column 1, which is normally used in a vertical orientation as shown. The distillation column has a vertical longitudinal axis A and a substantially circular horizontal cross-section. The column 1 comprises a first treating zone 2, having an axis coincident with the axis A of the column 1, and a fluid inlet device 3 disposed in the treating zone 2. The first treating zone 2, is disposed halfway between the top end and the bottom end of the column 1 of which the positions are indicated by means of arrows 4 and 5 respectively, which also represent the respective upward flow of gas and the downward flow of fluid through the column during normal operation.

The first treating zone 2 is in the direction of the top of the column bounded by a horizontally disposed first gas treatment tray 6 and in the direction of the bottom 5 of the column bounded by a horizontally disposed first liquid tray 7. The fluid inlet device 3 is therefore located between two successive trays 6, 7.

The fluid inlet device 3 comprises five circumferential vanes 9A–9E. The circumferential vanes of this embodiment are trumpet-like, ring-shaped vanes 9A–9E having a circular cross-section. The vanes 9A–9E are coaxially disposed around a central axis A' extending coaxially with the central upwardly extending axis A of the column 1. The inlet device 3 is in fluid communication with an inlet nozzle 8 which is attached to an inlet end 10 of the fluid inlet device 3. The inlet nozzle may pass through the side wall of the column 1 as shown, but may also extend more along the axis A of the column 1. It has been found that the inlet device can be installed shortly after a bend in the inlet piping without negatively influencing the gas distribution in the column. This allows, for example, the inlet piping to be externally attached to the column before entering the column.

The vanes are disposed along the central axis A' one behind the other at equal spacings. The vanes 9A–9E curvedly extend between a substantially cylindrical intercepting part 11A–11E having a substantially axially extending leading edge 15A–15E facing the inlet 10 and a deflecting part 12A–12E having a substantially radially outwardly extending trailing edge 16A–16E. A substantially cylindrical intercepting part having a substantially axially extending leading edge forms an angle of less than about 20°, preferably less than about 10°, more preferably less than about 5° with the axis A', and preferably such that the intercepting part has a constant or widening diameter in the direction of fluid flow during normal operation. The intercepting parts 11A–11E of successive vanes 9A–9E have decreasing diameters Da–De, respectively (of which only Da is indicated in the drawing for the sake of clarity), and are placed one behind the other along the central axis A at even intervals, and such that the intercepting part of a successive vane extends into the previous vane, e.g. intercepting part 11C of vane 9C extends into vane 9B. The leading edges 15A–15E of the intercepting parts 11A–11E are disposed such that they converge along the surface of a linear cone having a top angle of α=20°. The diameter Da of the intercepting part 11A of the first vane 9A defines the outer inlet diameter of the fluid inlet device 3 and has a ratio of 0.133 to the diameter D of the inside of the column at the treating zone.

The deflecting parts of the vanes may extend radially outwardly to a fully horizontal direction, but preferably part or all of the vanes enclose an angle between the deflecting part at its trailing edge and the horizontal plane, wherein angles between 0° and 90° are counted such that the trailing edge points away from the inlet end. In the orientation shown in the FIGURE this is an upward angle. More preferably, the more centrally placed vanes enclose an upward angle at their trailing edges, e.g. at edges 16D, and 16E. The angle with the horizontal of the trailing edge of the vanes is preferably between 0° and 85°, wherein the angle of a single vane is preferably larger or equal to the angle of the preceding (next larger) vane of the fluid inlet device. More preferably, the most centrally positioned vane, i.e. the last vane 9E, has an angle of between 50° and 85° and most preferably about 80°. The vanes having the larger angles as described hereinbefore are preferably clipped as shown in the FIGURE and discussed below.

The vanes are supported on rods 13. Alternatively, the vanes may be connected by radially extending ribs, e.g. in an embodiment wherein the intercepting parts of the vanes extend into a coaxial bundle. It is also possible, but not generally needed, to support the vanes on an axial rod.

The vanes 9A–9E are of substantially the same basic shape. The uppermost two vanes, i.e. the two posterior vanes 9D and 9E in axial upward direction are clipped or trimmed, i.e. they extend over a shorter relative length than the first three lower, anterior vanes 9A–9C. This way, the uppermost two vanes 9D and 9E extend towards their trailing edges 16D, 16E increasingly axially upwardly compared to the three anterior vanes 9A–9C. The vanes are clipped at a length ratio of 0.4–0.5, preferably 0.48, with respect to the length of the full vanes 9A–9C starting from the bottom edge of the intercepting part. The deflecting parts 12A–12E of successive vanes 9A–9E extend to a radially decreasing diameter.

The vanes suitably have a surface that minimizes obstructions to fluid flow between consecutive vanes, such that fluid can be passed through the inlet device at large volume flow rates. The inner and/or outer surface of the vanes is suitably not provided with obstructions which substantially decrease the inlet cross section of the annular space between the vanes.

Preferably, the circular outlet formed by the trailing edge 16E of the most centrally positioned vane 9E is (partly) closed (not shown in the FIGURE). More preferably, a small opening is present in order to minimize gas re-circulation just above the fluid inlet device. The area of this opening is preferably up to 25% of the total area of the above circular outlet formed by trailing edge 16E. Such a closed or partly closed outlet is preferably arranged when the most centrally positioned vane is a clipped vane having an angle of between 50° and 85° between its trailing edge and the horizontal.

As indicated with arrows F, the fluid comprising a mixture of liquid and gas is upwardly brought into the treating zone 2 as a substantially cylindrical flow through the inlet end 10 of the fluid inlet device by means of nozzle 8. The successive leading edges 15A–15E of the intercepting parts 11A–11E of the vanes 9A–9E divide the flow in concentric layers. The concentric layers are subsequently deflected radially outwardly by means of the successive deflecting parts 12A–12E. Adjacent vanes cooperate to form ducts that divert the fluid flow radially outwardly relative to the central axis A' and A. Due to inertia, the liquid strikes the deflecting zones of the vanes and flows radially outwards towards column wall. The gas flows radially outwardly towards the inner wall of the column 1. As the trailing edges of successive vanes extend to a decreasing radial diameter, the more radially inwardly disposed portions of the incoming flow are conducted less far radially outward than the more radially outward disposed portions of the cylindrical flow. Furthermore, the more radially inwardly disposed layers of the cylindrical flow are deflected more axially upwardly than the radially outwardly disposed layers, such that the gas flow is distributed evenly over the first treating zone 2.

It shall be clear that the invention is not limited to the preferred embodiment shown in the drawing. In particular, the treating zone may comprise a plurality of fluid inlet devices, each having a central axis extending parallel to a central upward axis of the treating zone. In particular, in this fashion a number of fluid inlet devices having their own central axes may be disposed around an optional fluid inlet device extending along a main upward axis of the treating zone. Furthermore, the intercepting part of the top vane may be formed as a closed thorn, such that direct axial upward flow is blocked. The number of vanes may be larger, e.g. 10, or smaller, e.g. 3. The horizontal cross section of the circumferential vanes of generalized bell-shape may not be circular, e.g. oval, star-shaped, polygonal, rectangular, square or e.g. defined by a waved line superimposed on a circle. Preferably, however, the ring-shaped vanes are symmetrical relative to their central axis. The fluid inlet device can also be arranged upside down when compared to the FIGURE, so that the inlet end is at the upper end, and the vanes widen in downward direction.

The present invention can be applied in a column wherein gas and liquid are counter-currently contacted. Such columns are for example used in fractionation, e.g. distillation, or in gas treating. Depending on the actual application, gas-liquid mixtures need to be introduced at different axial locations in such a column. The fluid inlet device according to the present invention can be used at one or more of these different locations. One possibility is the central feed inlet in a distillation column. A further possibility for the inlet of a gas-liquid mixture received as effluent from a reboiler, which heats up liquid collected at the bottom of the column. The reboiler effluent is normally reintroduced into the lower part of the column. A third possibility is the inlet of a reflux stream received from condensation of top product, and this reflux stream is normally re-introduced into the top part of the column.

Such embodiments are within the scope of the invention as defined in the appended claims.

We claim:

1. An apparatus for treating a fluid, the apparatus comprises:
 a treating zone comprising:
  an axis; and,
   a fluid inlet and separation device for introducing a separated mixture of liquid and gas into the treating zone, the fluid inlet and separation device comprising a series of coaxially disposed circumferential vanes, wherein each circumferential vane curvedly extends with respect to a central axis of the fluid inlet and separation device between an intercepting part having a substantially axially directed leading edge and a deflecting part having a substantially radially outwardly extending trailing edge, the central axis of the fluid inlet and separation device extending parallel or coaxial with the axis of the treating zone, wherein the treating zone lies within a vertically disposed cylindrical column having a longitudinal axis, wherein the central axis of the fluid inlet and separation device extends parallel or coaxial with the longitudinal axis of the vertically disposed cylindrical column, and wherein the fluid inlet and separation device is disposed between two horizontally extending partitions or trays of the vertically disposed cylindrical column defining the treating zone.

2. The apparatus of claim 1, in which the circumferential vanes have a cross section selected from the group consisting of circular, oval, star-shaped, polygonal, rectangular, square cross-section and a cross-section defined by a waved line superimposed on a circle.

3. The apparatus of claim 1, in which the intercepting part is substantially cylindrical.

4. The apparatus of claim 1, in which the intercepting parts of successive circumferential vanes have decreasing cross-section.

5. The apparatus of claim 1, in which the leading edges of the circumferential vanes are spaced along the central axis.

6. The apparatus of claim 1, in which the successive leading edges of the circumferential vanes converge along a linear cone having a top angle between 10°–50°.

7. The apparatus of claim 1, in which the trailing edges of successive circumferential vanes extend to decreasing diameters.

8. The apparatus of claim 1, in which the vanes are of substantially equal shape.

9. The apparatus of claim 1, in which the circumferential vanes extend outwardly such that the angle at the trailing edge with the horizontal is between 0° and 85°.

10. The apparatus of claim 9, in which the angle of the deflecting part at the trailing edge with the horizontal of a selected circumferential vane is larger than or equal to the angle of the previous circumferential vane of the fluid inlet device.

11. The apparatus of claim 10, in which the most centrally positioned vane has an angle of between 50° and 85° between the deflecting part at its trailing edge and the horizontal.

12. The apparatus of claim 1, in which the number of vanes ranges from 2 to 10.

13. The apparatus of claim 1, wherein the cross-section of the first vane at its leading edge is less than the cross-section of a cylinder having a diameter of about 20% of the diameter of the column.

14. The apparatus of claim 1, in which the axis of the fluid inlet and separation device is arranged vertically, and wherein the fluid inlet and separation device is arranged to receive the mixture of gas and liquid at its lower end.

15. A method for introducing a mixture of liquid and gas into a vessel said method comprises:
 dividing an initially substantially cylindrical flow of said mixture into concentric layers, wherein the concentric layers are deflected radially outwardly, and wherein the more radially inwardly disposed layers are deflected more axially upwardly than the more radially outwardly disposed layers are deflected.

* * * * *